US006721079B2

(12) United States Patent
Yeh et al.

(10) Patent No.: US 6,721,079 B2
(45) Date of Patent: Apr. 13, 2004

(54) OPTICAL PATH LENGTH TUNING METHODS IN ETALONS

(75) Inventors: Pochi Albert Yeh, Thousand Oaks, CA (US); Scott Patrick Campbell, Thousand Oaks, CA (US)

(73) Assignee: Accumux Technologies, Inc., Camarillo, CA (US)

( * ) Notice: Subject to any disclaimer, the term of this patent is extended or adjusted under 35 U.S.C. 154(b) by 51 days.

(21) Appl. No.: 10/215,054

(22) Filed: Aug. 8, 2002

(65) Prior Publication Data

US 2003/0035223 A1 Feb. 20, 2003

Related U.S. Application Data

(60) Provisional application No. 60/311,534, filed on Aug. 9, 2001.

(51) Int. Cl.[7] .............................. G02F 1/03; G02B 27/00
(52) U.S. Cl. ...................................... 359/260; 359/578
(58) Field of Search ................... 359/260, 578, 359/584, 589

(56) References Cited

U.S. PATENT DOCUMENTS

| | | | | |
|---|---|---|---|---|
| 4,977,563 A | * | 12/1990 | Nakatani et al. | 372/32 |
| 4,991,178 A | * | 2/1991 | Wani et al. | 372/32 |
| 5,710,655 A | | 1/1998 | Rumbaugh et al. | 359/249 |
| 5,828,687 A | | 10/1998 | Colgan | 372/92 |
| 5,949,542 A | | 9/1999 | Kohnke et al. | 356/517 |
| 6,215,802 B1 | | 4/2001 | Lunt | 372/34 |
| 6,552,856 B1 | * | 4/2003 | Chen | 359/634 |
| 2003/0035223 A1 | * | 2/2003 | Yeh et al. | 359/665 |

* cited by examiner

*Primary Examiner*—David N. Spector
(74) *Attorney, Agent, or Firm*—Morrison & Foerster LLP

(57) ABSTRACT

Fine-tuning of the optical path length in etalon cavities is achieved by slight variations of the cavity's index of refraction. Such index of refraction variations are accomplished by varying the relative gas mixture in gas-gap etalons or UV-exposing doped glass layer(s) in solid etalons or gas-gap+glass etalons.

15 Claims, 5 Drawing Sheets

US 6,721,079 B2

OPTICAL PATH LENGTH TUNING METHODS IN ETALONS

CROSS-REFERENCE TO RELATED APPLICATION

Embodiments of the present invention claim priority from U.S. provisional patent application Ser. No. 60/311,534, entitled "Optical Path Length Tuning Methods In Etalons," filed Aug. 9, 2001, the contents of which is incorporated herein by reference for all purposes.

BACKGROUND OF THE INVENTION

1. Field of the Invention

The present invention relates, generally, to devices and methods for fine tuning the optical path length in etalon cavities and, in preferred embodiments, to devices and methods for fine tuning the optical path length in etalon cavities by varying the relative gas mixture in gas-gap etalons or UV-exposing intra-cavity layer(s) in solid etalons or gas-gap+glass etalons.

2. Description of Related Art

An etalon is an optically transparent medium sandwiched between two mirrors. In practice, the cavity formed between the two mirrors can be a parallel plate of glass with mirror coatings on both sides, or two parallel mirrors separated by a distance. Such an etalon is also known as Fabry-Perot etalon if both mirrors are identical. In the case when one mirror has a 100% reflectivity, such etalons are known as Gires-Tournois etalons. The optical path length (OPL) in the cavity of an etalon is defined as $$OPL = \sum_{j=1}^{J} L_j n_j, \quad (1)$$

where $L_j$ is the physical length of a path and $n_j$ is the refractive index in that length. This concept is diagrammed in FIG. 1 for an example etalon having two sections. In FIG. 1, a first cavity section 101 has a physical thickness $L_1$ and a refractive index $n_1$, while a second cavity section 102 has a physical thickness $L_2$ and a refractive index $n_2$. The fine-tuning of an OPL can be achieved by adjusting either L or n for a given OPL section. Previous similar solutions include electro-optic modulation of n, magneto-optic modulation of n, piezo-electric modulation of L, thermal modulation of n and/or L, and the like. However, conventional methods either do not allow for fine tuning of an OPL, or for permanent fine-tuning of an OPL in-situ.

SUMMARY OF THE DISCLOSURE

It is an advantage of embodiments of the present invention to provide a device and method for fine-tuning the optical path length in etalon cavities.

The above-described and other advantages are accomplished by slight variations of the cavity's index of refraction. Such index of refraction variations are accomplished by varying the relative gas mixture in gas-gap etalons or UV (or other)-exposing intra-cavity layer(s) in solid etalons or gas-gap+solid etalons.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

The solutions herein offered as embodiments of the present invention are twofold, involving a variable gas mixture to modulate the refractive index n and the exposure of an intra-cavity plate using UV or other forms of radiation to modulate its refractive index n.

Figure 1:
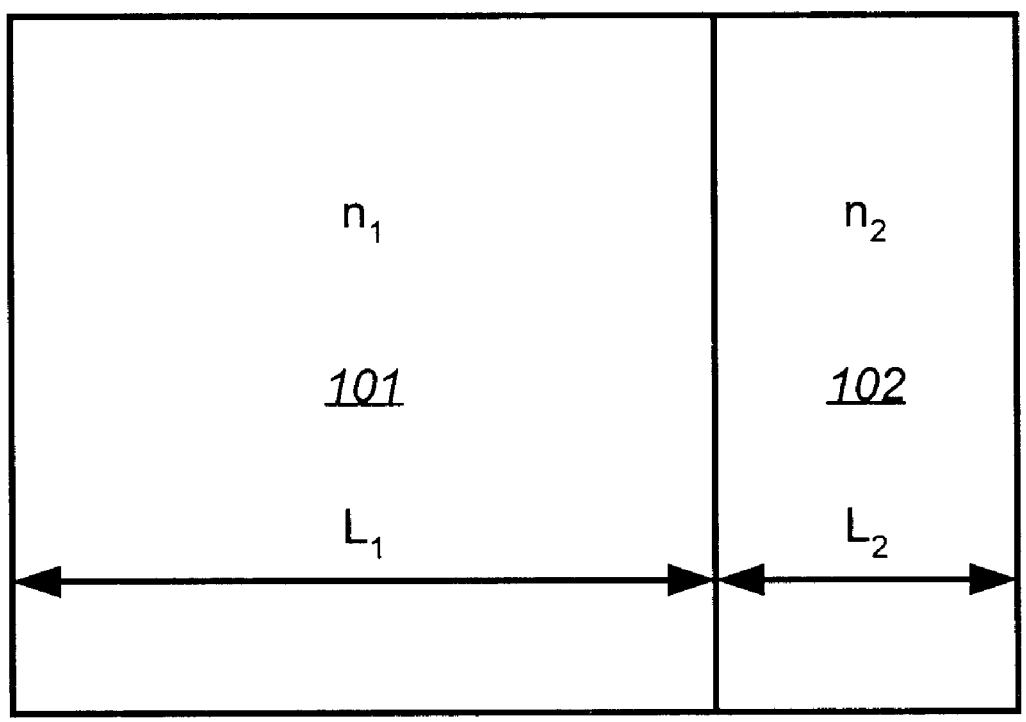
FIG. 1 is a block diagram of an OPL in the cavity of an etalon having two sections.

The concept of using a variable gas mixture to fine tune the refractive index in an optical path length according to an embodiment of the present invention is described herein. Consider the OPL as described in Equation (1). Such an OPL can be broken into the sum of lesser OPL sections by allowing the refractive index in a given length segment to be unique. For example, consider two such OPL sections, $L_1 n_1 + L_2 n_2$, as diagrammed in FIG. 1. Let $n_1$ be the refractive index of gas 1 and $n_2$ be the refractive index of gas 2. The net OPL of this combination is thus fine tuned by either choosing different combinations of gases, different combinations of lengths, or both. This concept can be extended to a more realistic geometry (because the two gas paths will not remain separate in a real system) by allowing the gases to mix. For example, if both gases are contained in a volume of fixed cross sectional area A, then they fill respective volumes $V_1 = A L_1$ and $V_2 = A L_2$. The weighted sum of the refractive indices therefore become $$\bar{n} = \frac{V_1 n_1 + V_2 n_2}{V_1 + V_2}, \quad (2)$$

where n-bar is the net refractive index throughout the whole physical path $L_1 + L_2$. Under these conditions, the OPL becomes $$OPL = (L_1 + L_2) \bar{n}. \quad (3)$$

Figure 2:
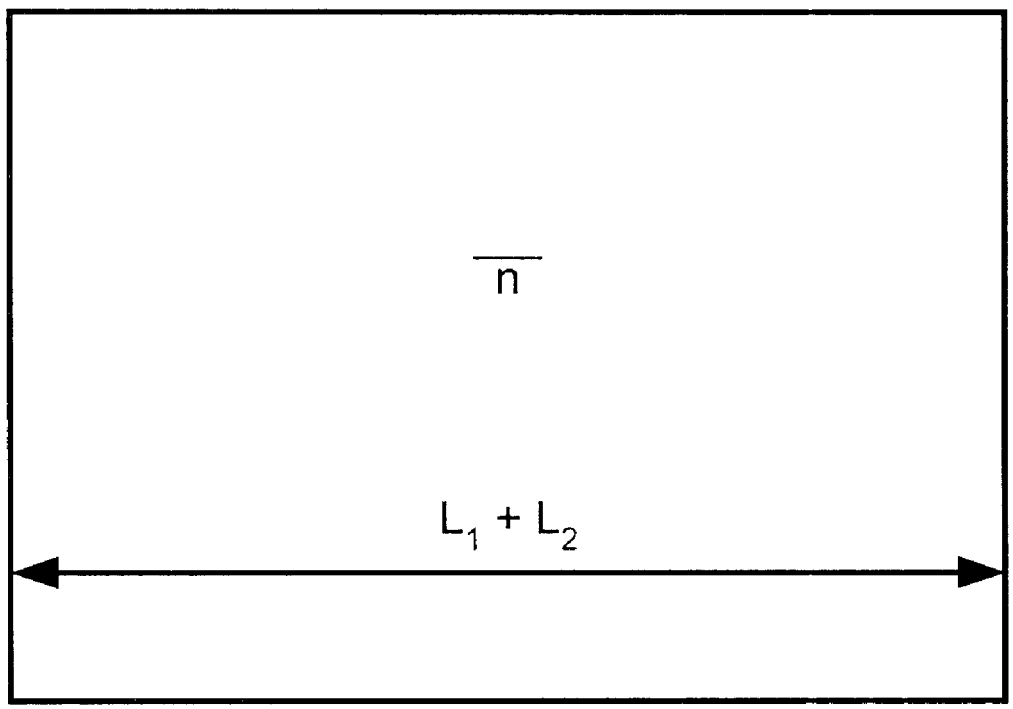
FIG. 2 is a block diagram illustrating the use of a variable gas mixture to fine tune the refractive index in an optical path length according to an embodiment of the present invention.

Such a concept is diagrammed in FIG. 2. Therefore, by adjusting the relative volumes of the gases in a path, one can fine-tune the net refractive index of the path (and thus the OPL of the path) without changing the physical path length of the path. Such a solution is useful, for example, for tuning the cavity path in a gas-gap etalon when the cavity length cannot be tuned and/or cannot be tuned to sufficient resolution and/or permanence. As an order of magnitude example, consider the mixing of argon gas and carbon dioxide gas. At room temperature, $n_a=1.000232$ is the refractive index of Argon gas and $n_c=1.000399$ is the refractive index of Carbon Dioxide gas. The total optical path length of the cavity containing a mixture of these two gasses can thus be varied as much as 0.0167% simply by adjusting the relative volumes of the individual gases in the mixture. For example, if the cavity's physical path length is 1.5 mm, then its optical path length can be tuned from 1.500348 mm to 1.500599, mm, or over a range of 251 nm. Once the appropriate gas mixture is achieved, the cavity can be sealed off to maintain its refractive index. For example, an optical cavity may be designed so that the cavity is completely enclosed, except for a small hole with a diameter of approximately 0.2 millimeters. A gas mixture can be injected into the cavity through the hole. The forced injection from a pressurized source through a tube or nozzle displaces gas existing in a cavity. This gas injection may be performed while the optical cavity is illuminated with a beam of light to examine the optical thickness of the cavity. With in-situ monitoring, the hole can be sealed off when the proper optical thickness is achieved using a number of methods (glue, melting, a gasket, and the like).

Figure 3:
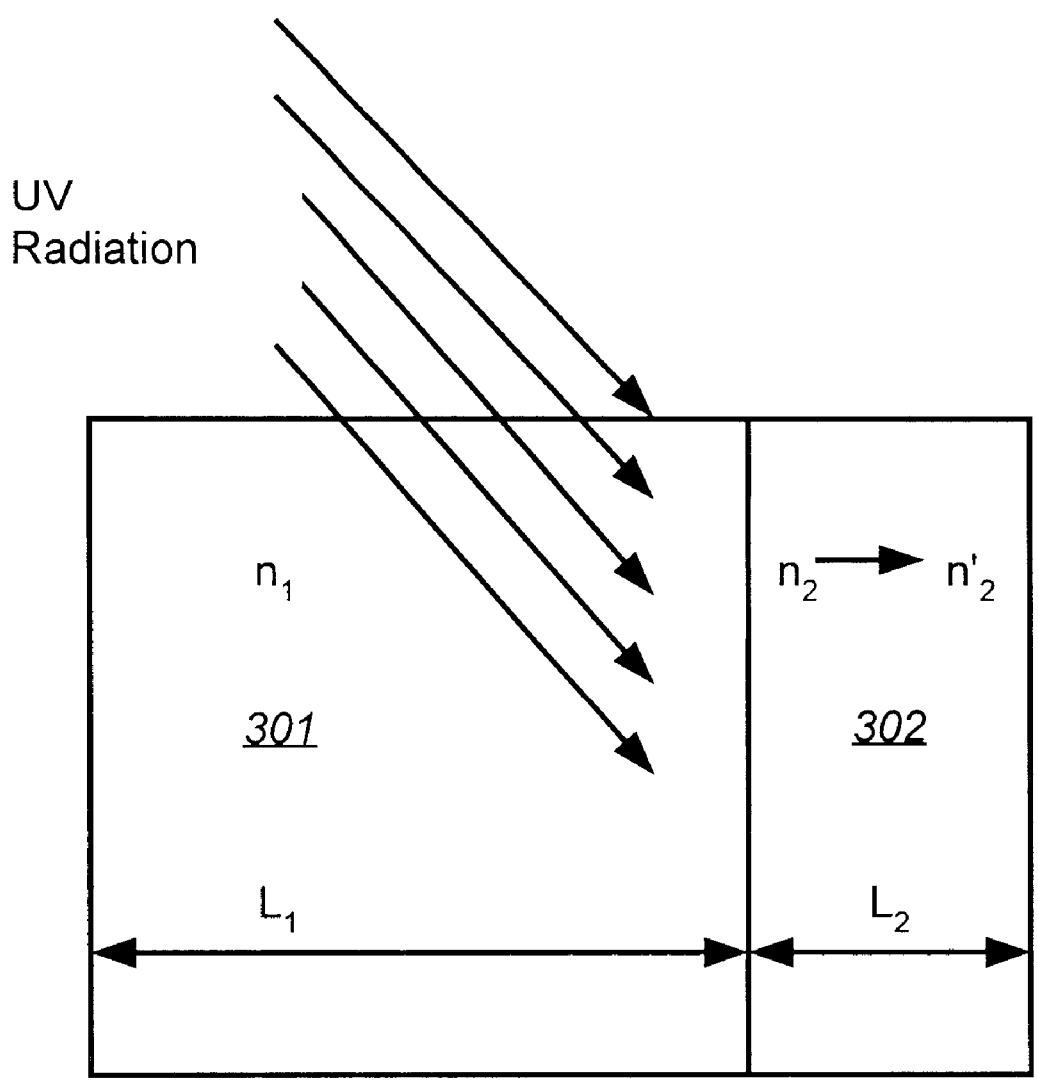
FIG. 3 is a block diagram illustrating the use of ultraviolet exposure (UVE) to fine tune the refractive index in an optical path length according to an embodiment of the present invention.

The concept of using Ultra Violet Exposure (UVE) or other types of exposure to fine-tune the refractive index in an optical path length according to an embodiment of the present invention is described herein. It is well known that certain glasses (or other solid media), such as germanium-doped glass, exhibit a refractive index that is adjustable by exposure to UV radiation. If such a glass is in the optical path of a beam, then that optical path can be modified slightly by exposing the glass to UV radiation. Typically, the refractive index can be adjusted as much as 0.1%. Once the UVE completes, the refractive index remains fixed at its value at the end of the UVE. Thus, an OPL can be tuned in-situ by exposure to UV (or other) radiation if the OPL contains a glass (or other solid media) whose refractive index varies with UVE. In this manner, the OPL can be fine-tuned. For example, perhaps only a fraction of the total optical path contains glass (or other solid media) that is sensitive to UVE (or other radiation). According to Equation (1), the range of net refractive index tunability can be adjusted by adjusting how much of the total path contains the tunable glass (or other solid media). The resulting net tuning in the OPL will thus follow the weighted sum tuning as per Equation (2). For example, such a concept is diagrammed in FIG. 3, wherein there exists a physical path length $L_1$ in a material 301 that is not tunable by UVE, and a physical path length $L_2$ in a material 302 that is tunable by UVE. Before UVE, the refractive index in the tunable path is $n_2$, while after UVE the refractive index in the tunable path is $n_2'$.

Note that in alternative embodiments of the present invention, the cavity of an etalon may be a combination of mixed gases and solid media whose refractive indices are adjustable by exposure to radiation. Thus, the two concepts described above may be combined to provide further fine tuning of the optical path length of an etalon.

Figure 4A:
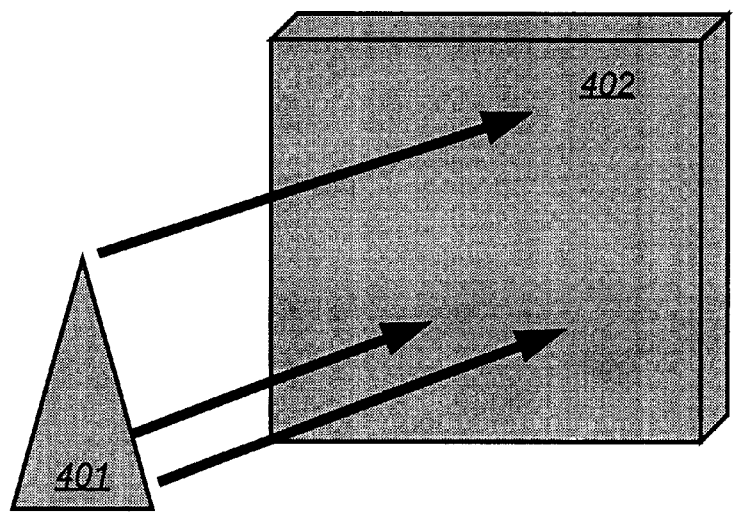
FIG. 4a is a block diagram illustrating the use of spatially-varying UVE to fine tune the refractive index in an optical path length according to an embodiment of the present invention.
Figure 4B:
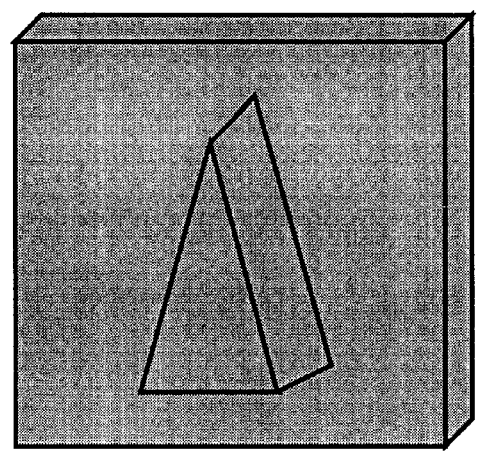
FIG. 4b is a block diagram illustrating the effect of spatially-varying UVE to create a spatially-varying OPL tuning according to an embodiment of the present invention.

As an additional effect and alternative embodiment of the present invention, it is possible with UVE (or other forms of exposure) to create spatially-varying OPL tunings. That is, if the exposure of the UV illumination is spatially varied in a certain pattern, then such a pattern can be impressed into the OPL. This concept is diagrammed in FIG. 4. In FIG. 4a, a triangular UV illumination profile 401 is incident into a UV tunable substrate 402. After exposure, this triangular pattern is impressed into the refractive index profile of the substrate, as shown in FIG. 4b. The profile impressed can be continuously variable, step-wise, or some combination thereof. To illustrate the advantage of a triangular pattern, consider a simple case when the UV beam intensity varies linearly across the beam. In the high intensity side, the index change is maximum, while in the low intensity side, the index change is minimum. Thus, an optical cavity may be produced in which the OPL varies across the aperture. The transmission or reflection property of such an optical cavity may then be tuned by a simple transverse displacement of the cavity relative to the beam. However, it should be understood that a triangle is just an example of a general case. The point is to compensate for optical path length errors in the cavity as needed, so the profile impressed must match the needed profile to compensate the error (in both shape and magnitude of compensation).

As a natural extension to intra-cavity exposure tuning, it is also possible to affect the refractive indices of the mirror stacks' layers in an etalon. In doing so, both the reflectivity function and the effective length function of a dielectric stack can be modified. Such modifications will alter both the resonance points in the etalon (due to alterations in the mirror stacks' effective length functions) and the finesse of the etalon (due to alterations in the mirror stacks' reflectivity functions). Optical transmission or reflection through such etalons depend on the etalon thickness relative to the wavelength of light. For example, maximum transmission in Fabry-Perot etalons occurs when the OPL of the etalon is an integral number of half-wavelengths. This (maximum transmission) is also known as resonance. The transmission spectrum consists of a comb structure of transmission peaks with equal spacing in optical frequencies (known as free spectral spacing (FSR)). For example, an etalon OPL of 1.5 mm will give a FSR of 100 GHz. The spectral width of each of the peaks depends on the mirror reflectivity. A parameter, known as the Finesse, defined as the ratio of FSR to the spectral width, is a measure of the sharpness of the peaks. To achieve high Finesse, mirrors of high reflectivity are needed. This is often achieved by using multi-layer dielectric coatings (mirror stacks). A simple way to achieve high reflectance mirror is to deposit alternating layers of high and low index materials (e.g., SiO2 and TiO2).

Figure 5A:
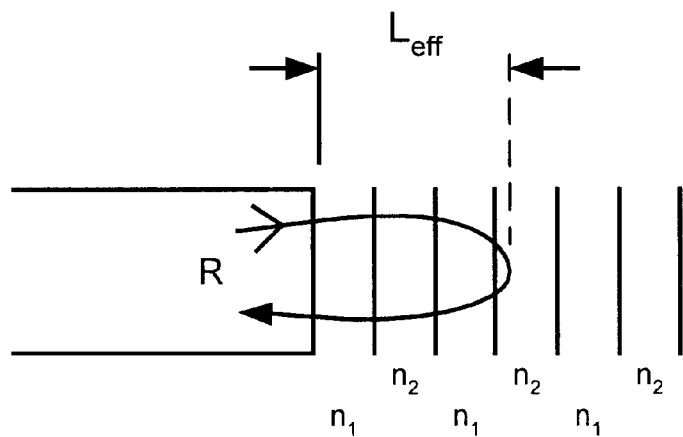
FIG. 5a illustrates the reflectivity of a dielectric stack mirror on one end of an etalon before exposure.
Figure 5B:
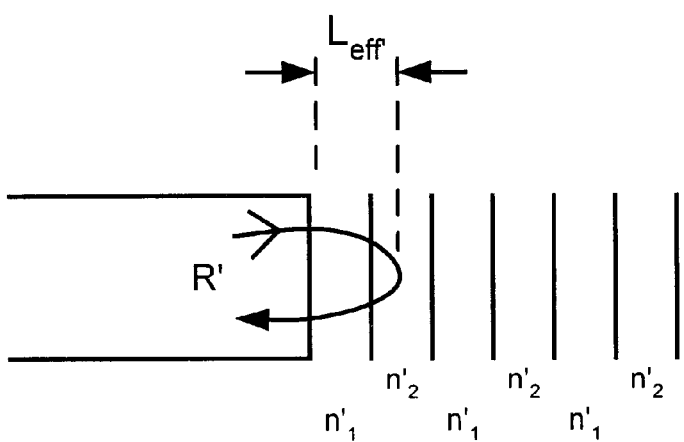
FIG. 5b illustrates a shift in the effective length function of a dielectric stack and the reflectivity of a dielectric stack mirror on one end of an etalon after exposure to UVE according to an embodiment of the present invention.

The concept of affecting the refractive indices of the mirror stacks' layers in an etalon is diagrammed in FIG. 5. FIG. 5a shows the dielectric stack mirror on one end of an etalon before exposure, with stack indices $n_1$ and $n_2$, effective length $L_{eff}$, and reflectivity R. The purpose of multiple stacks with alternating indices is to make mirrors with high mirror reflectivity. After exposure (FIG. 5b), the stacks' refractive indices have shifted to $n_1'$ and $n_2'$, thereby causing its effective length to shift to $L_{eff}'$ and its reflectivity to shift to R'. The manner in which $L_{eff}$ and R shift in such a case is embedded in the matrix mathematics that describe a dielectric stacks' behavior. Optical transmission and reflection properties of multiple layers can be obtained by employing a matrix method. Matrix mathematics are described in Poehi Yeh, "Optical Waves in Layered Media," Wiley, 1988, incorporated herein by reference.

Although the present invention has been fully described in connection with the accompanying drawings, it is to be noted that various changes and modifications will become apparent to those skilled in the art. Such changes and modifications are to be understood as being included within the scope of the present invention as defined by the appended claims.

What is claimed is:

1. A method for tuning an optical path length of an etalon with a cavity of length L and comprised of a plurality of gases having at least two refractive indices, the cavity having a net refractive index across the length L which is a function of the refractive indices of the plurality of gases, the optical path length defined as the length L multiplied by the net refractive index, the method comprising:

adjusting a relative volume of the plurality of gases to fine-tune the net refractive index.

2. The method as recited in claim 1, further comprising:

in-situ monitoring the optical path length of the etalon while adjusting the relative volume of the plurality of gases; and ceasing adjustment of the relative volumes of the plurality of gases when the desired optical path length is achieved.

3. A method for tuning an optical path length of an etalon with a cavity of length L and comprised of one or more solid media, one or more of the solid media having a refractive index that is adjustable when exposed to radiation, the cavity having a net refractive index across the length L which is a function of the refractive indices of the solid media, the optical path length defined as the length L multiplied by the net refractive index, the method comprising:

irradiating one or more of the solid media having a refractive index that is adjustable when exposed to radiation to fine-tune the net refractive index.

4. The method as recited in claim 3, further comprising:

in-situ monitoring the optical path length of the etalon while irradiating the solid media; and ceasing irradiation of the solid media when the desired optical path length is achieved.

5. The method as recited in claim 3, further comprising:

adjusting a relative volume of the one or more of the solid media having a refractive index that is adjustable when exposed to radiation to fine-tune the net refractive index.

6. The method as recited in claim 3, further comprising:

irradiating one or more of the solid media having a refractive index that is adjustable when exposed to radiation in a spatially varying pattern so that the refractive index of the irradiated solid media varies; and tuning the optical path length by transverse displacement of a light beam across the irradiated solid media.

7. The method as recited in claim 6, further comprising:

selecting the spatially varying pattern to match an optical path length error profile.

8. A method for tuning a reflectivity and an effective length of a mirror stack of an etalon comprised of one or more solid media, one or more of the solid media of the mirror stack having a refractive index that is adjustable when exposed to radiation, the reflectivity and the effective length of the mirror stack being a function of the refractive indices of the solid media, the method comprising:

irradiating one or more of the solid media having a refractive index that is adjustable when exposed to radiation to fine-tune the reflectivity and the effective length of the mirror stack.

9. The method as recited in claim 8, further comprising:

in-situ monitoring the reflectivity and the effective length of the mirror stack of the etalon while irradiating the solid media; and ceasing irradiation of the solid media when the desired reflectivity and effective length of the mirror stack is achieved.

10. An etalon comprising:

two parallel mirrors separated by a distance L;

a cavity formed between the two mirrors; and a plurality of gases having at least two refractive indices within the cavity;

wherein the cavity has a net refractive index across the distance L which is a function of the refractive indices of the plurality of gases, the optical path length is defined as the distance L multiplied by the net refractive index; and wherein the cavity contains a relative volume of each of the plurality of gases to produce a desired optical path length.

11. An etalon comprising:

two parallel mirrors separated by a distance L;

a cavity formed between the two mirrors; and one or more solid media having a refractive index that is adjustable when exposed to radiation within the cavity;

wherein the cavity has a net refractive index across the distance L which is a function of the refractive indices of the solid media, the optical path length is defined as the distance L multiplied by the net refractive index; and wherein the cavity contains one or more radiated solid media having a refractive index that is adjustable when exposed to radiation to produce a desired optical path length.

12. The etalon as recited in claim 11, further comprising:

wherein the cavity contains a relative volume of the one or more of the solid media having a refractive index that is adjustable when exposed to radiation to produce a desired optical path length.

13. The etalon as recited in claim 11, wherein the cavity contains one or more solid media having a refractive index that is adjustable when exposed to radiation irradiated in a spatially varying pattern so that the refractive index of the irradiated solid media varies across its surface.

14. The etalon as recited in claim 13, wherein the spatially varying pattern is selected to match an optical path length error profile.

15. An etalon comprising:

two parallel mirrors, at least one of the mirrors formed from a mirror stack comprised of one or more solid media, one or more of the solid media having a refractive index that is adjustable when exposed to radiation, the mirror stack having a reflectivity and effective length which is a function of the refractive indicies of the solid media; and a cavity formed between the two mirrors;

wherein the mirror stack contains one or more irradiated solid media having a refractive index that is adjustable when exposed to radiation to produce a desired reflectivity and effective length for the mirror stack.

* * * * *